(12) United States Patent
Kojima et al.

(10) Patent No.: US 10,296,746 B2
(45) Date of Patent: May 21, 2019

(54) INFORMATION PROCESSING DEVICE, FILTERING SYSTEM, AND FILTERING METHOD

(71) Applicant: FUJITSU LIMITED, Kawasaki-shi, Kanagawa (JP)

(72) Inventors: Hisashi Kojima, Yokosuka (JP); Masahiro Nakada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 15/003,294

(22) Filed: Jan. 21, 2016

(65) Prior Publication Data
US 2016/0140345 A1    May 19, 2016

Related U.S. Application Data

(63) Continuation of application No. PCT/JP2013/070305, filed on Jul. 26, 2013.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
USPC .......... 726/25, 2, 21, 36; 713/150, 163, 181; 380/255, 264, 276
See application file for complete search history.

(56) References Cited

U.S. PATENT DOCUMENTS

| | | | |
|---|---|---|---|
| 8,127,358 B1* | 2/2012 | Lee | G06F 21/564 726/22 |
| 9,448,820 B1* | 9/2016 | Allen | G06F 9/455 |
| 2003/0212757 A1 | 11/2003 | Niikura et al. | |
| 2008/0243543 A1* | 10/2008 | Jung | G16H 50/20 705/2 |
| 2010/0083240 A1* | 4/2010 | Siman | G06F 8/433 717/144 |

(Continued)

FOREIGN PATENT DOCUMENTS

| | | |
|---|---|---|
| JP | 06-035857 A | 2/1994 |
| JP | 2002-328896 A | 11/2002 |
| JP | 2003-323383 A | 11/2003 |

(Continued)

OTHER PUBLICATIONS

Hideyuki Hanazawa, "Jikki o Shirabete Musen LAN no Sugao ni Semaru Musen LAN no Shirarezaru Joshiki", ASCII. Technologies, Jun. 24, 2010 (Jun. 24, 2010), vol. 15, No. 8, pp. 128-133 (Translation of the relevant part), and 168 cited in ISR for No. PCT/JP2013/070305.

(Continued)

*Primary Examiner* — Sharif E Ullah
(74) *Attorney, Agent, or Firm* — Fujitsu Patent Center

(57) ABSTRACT

An information processing device includes a processor configured to generate one or more sets of data corresponding to information about a testing method set in advance, to input the sets of generated data into a test device, to identify sets of data making the test device exhibit predetermined behavior, among the sets of generated data, and to refer to information common among the sets of identified data, to aggregate the sets of generated data.

3 Claims, 14 Drawing Sheets

(56) References Cited

U.S. PATENT DOCUMENTS

2013/0167241 A1   6/2013   Siman

FOREIGN PATENT DOCUMENTS

| | | |
|---|---|---|
| JP | 2007-188437 A | 7/2007 |
| JP | 2008-219149 A | 9/2008 |
| JP | 2010-507165 A | 3/2010 |
| WO | 2008047351 A2 | 4/2008 |

OTHER PUBLICATIONS

International Search Report and Written Opinion of the International Searching Authority (Form PCT/ISA/210, Form PCT/ISA/237), mailed in connection with PCT/JP2013/070305 and dated Oct. 29, 2013 (6 pages).

* cited by examiner

FIG.5A

```
GET / HTTP/1.1
Host: 192.168.1.10
Accept: text/html
Accept-Language: ja
Content-Length: 1
Max-Forwards: 10
User-Agent: Any browser 1.0
...
```
NORMAL PACKET

FIG.5B

```
GET / HTTP/1.1
Host: xxx····xxx
Accept: text/html
Accept-Language: ja
Content-Length: 1
Max-Forwards: 10
User-Agent: Any browser 1.0
...
```
TEST PACKET 1

FIG.5C

```
GET / HTTP/1.1
Host: 192.168.1.10
Accept: xxx····xxx
Accept-Language: ja
Content-Length: 1
Max-Forwards: 10
User-Agent: Any browser 1.0
...
```
TEST PACKET 2

FIG.5D

```
GET / HTTP/1.1
Host: 192.168.1.10
Accept: text/html
Accept-Language: ja
Content-Length: 256
Max-Forwards: 10
User-Agent: Any browser 1.0
...
```
TEST PACKET 3

FIG.5E

```
GET / HTTP/1.1
Host: 192.168¥0.10
Accept: text/html
Accept-Language: ja
Content-Length: 1
Max-Forwards: 10
User-Agent: Any browser 1.0
...
```
TEST PACKET 4

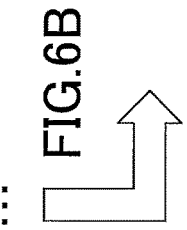

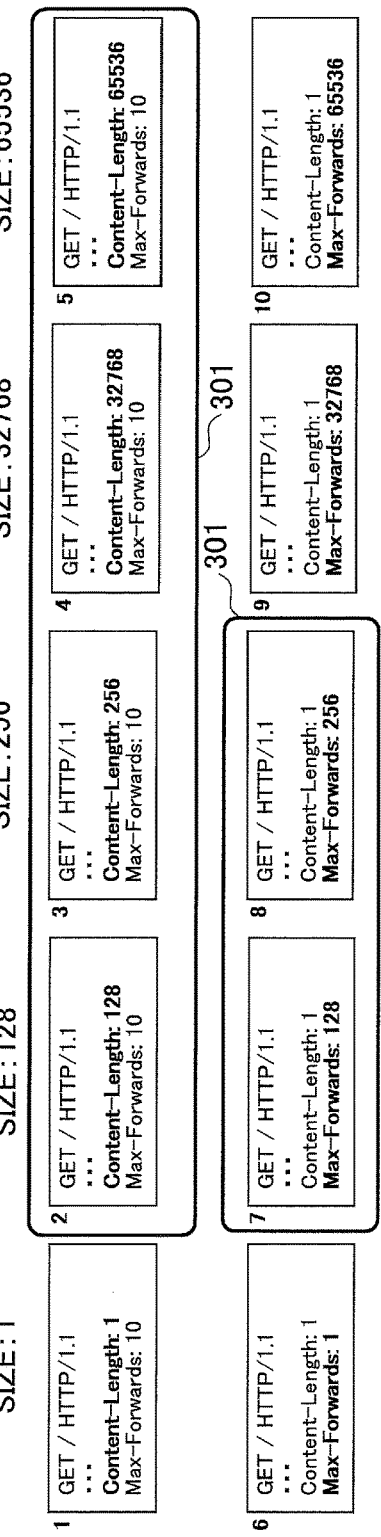
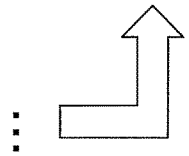
FIG.7A
FIG.7B

| SERIAL NUMBER IN LIST | TEST TYPE | NORMAL REQUEST | HTTP HEADER | CHARACTER | LENGTH |
|---|---|---|---|---|---|
| 1 | TEST A×C | REQUEST A | Host | ¥0 | ≧128 |
| 2 | TEST A×C | REQUEST A | Host | ¥r | 128~256 |
| ... | | | | | ... |

INFORMATION PROCESSING DEVICE, FILTERING SYSTEM, AND FILTERING METHOD

CROSS-REFERENCE TO RELATED APPLICATIONS

This application is a continuation application of International Application PCT/JP2013/070305 filed on Jul. 26, 2013 and designated the U.S., the entire contents of which are incorporated herein by reference.

FIELD

The disclosures herein generally relate to a filtering technology applied to data transmitted on a network.

BACKGROUND

In recent years, a method of black box security testing called "fuzzing" has come to be used widely. A tool for fuzzing detects vulnerability by executing trial runs of considerable variations of test data, which is considered to be effective to detect the vulnerability of a product to be tested. For example, fuzzing tools are used for uncovering latent vulnerability of the product such as a buffer overflow and an integer overflow. Note that in recent years, since fuzzing tools have become widely available to be used by anyone, a malicious person may easily uncover such latent vulnerability of a product.

Ideally, a product to be connected to a network should have robust security measures installed at the point of sale, in preparation for attacks coming from the network. However, it is often the case that vulnerability is newly uncovered after the products have been sold and transferred to consumers. Also, such a product may include various parts. Among these parts, some may include black box modules whose inside can be hardly investigated (modules whose source code cannot be inspected). Also, vulnerability may not be uncovered until the sold product is installed in a system of a purchaser. Also, even if vulnerability is uncovered in the sold products, update software corresponding to the vulnerability may need some time to be distributed. Therefore, it is urgently necessary to take measures for latent vulnerability of such products.

For example, there is a method for detecting vulnerability at an application program level, by scanning the source code of the application program automatically. Also, there is a method that accumulates or displays sets of data one by one, with which an operated application has terminated with an abnormal end, to analyze the cause of abnormality and to execute a recovering process. Also, there is a method that receives an e-mail message from a Post Office Protocol version 3 (POP3) server, and if determining that the e-mail message includes an error, registers a unique ID of the e-mail message, to refuse reception of e-mail messages having the same unique ID thereafter (see, for example, Patent Documents 1 to 3).

RELATED-ART DOCUMENTS

Patent Documents

[Patent Document 1] Japanese Laid-open Patent Publication No. 2010-507165
[Patent Document 2] Japanese Laid-open Patent Publication No. H6-35857
[Patent Document 3] Japanese Laid-open Patent Publication No. 2003-323383

In a fuzzing test described above, multiple sets of test data are generated for certain normal data, for example, by changing values, lengths, and the like of headers, and a huge number of generated sets of test data are used for testing. Therefore, since the number of sets of fault-causing data obtained as a test result is also great, the storage area becomes tight, and filtering requires a long time for comparing the test result data with input data obtained from a network.

SUMMARY

According to an embodiment, an information processing device includes a processor configured to generate one or more sets of data corresponding to information about a testing method set in advance, to input the sets of generated data into a test device, to identify sets of data making the test device exhibit predetermined behavior, among the sets of generated data, and to refer to information common among the sets of identified data, to aggregate the sets of generated data.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIGS. 5A-5E are diagrams that illustrate examples of a normal pattern and test patterns according to an embodiment;

FIGS. 6A-6C are diagrams that illustrate a first specific example of anomaly detection and a prevention target list;

FIGS. 7A-7B are diagrams that illustrate a second specific example of anomaly detection and a prevention target list;

DESCRIPTION OF EMBODIMENTS

In the following, embodiments will be described with reference to the drawings.

<Example of System Configuration of Filtering System>

Figure 1:
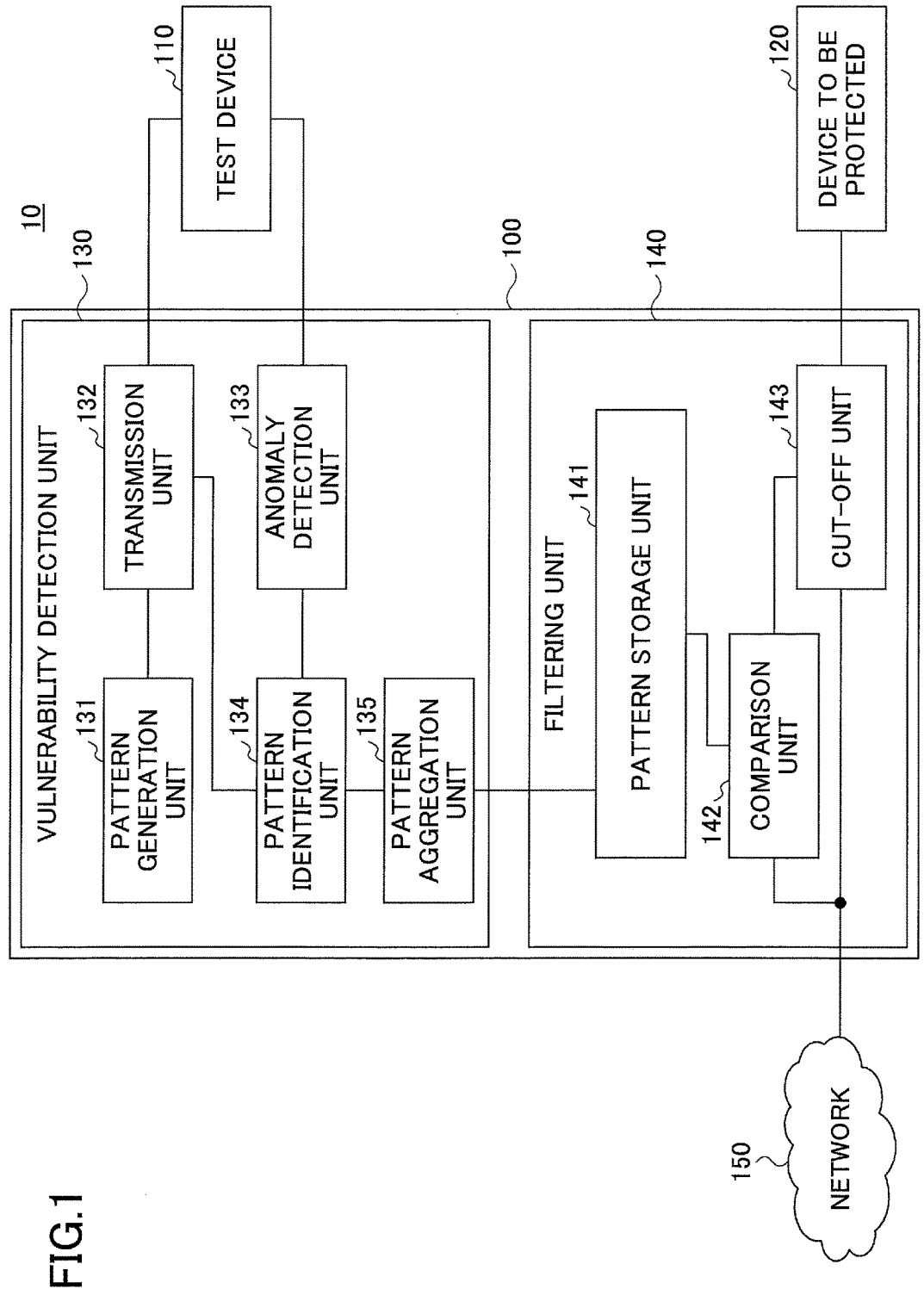
FIG. 1 is a diagram that illustrates an example of a system configuration of a filtering system according to an embodiment.

FIG. 1 is a diagram that illustrates an example of a system configuration of a filtering system according to an embodiment. The filtering system 10 illustrated in FIG. 1 includes a filtering device 100 as an example of an information processing device, a test device 110, and a device to be protected 120. The filtering device 100 includes a vulnerability detection unit 130 and a filtering unit 140.

The filtering device 100 applies testing by fuzzing to the test device 110 that corresponds to the device to be protected 120, to detect patterns of input data with which a fault may occur if unknown vulnerability of the device to be protected 120 is attacked. Also, using the detected patterns, the filtering device 100 prevents the fault-causing input data from reaching the device to be protected 120 from a network 150 or the like. The filtering device 100 may be, for example, a relay device such as a router, a server, and a personal computer (PC), but is not limited to these.

The test device 110 simulates, for example, behavior of the device to be protected 120, and may be implemented, for example, by a product having the same specification as the device to be protected 120. For example, if the device to be protected 120 is a server, the test device 110 is preferably a server having the same specification, and having the same software installed, but it is not limited to that. Note that the filtering system 10 in the embodiment may not include a test device 110, but may use the device to be protected 120 also as the test device 110.

The device to be protected 120 is connected with the network 150 via the filtering unit 140. The filtering unit 140 filters data that is to be transferred from the network 150 to the device to be protected 120. By this filtering, data that may threaten the vulnerability of the device to be protected 120 can be cut off.

The network 150 is, for example, the Internet or a local area network (LAN), and may be wired or wireless. The test device 110 and the device to be protected 120 can receive and transmit data with an external device (for example, a terminal) that is connected with the network 150 via the filtering device 100.

Note that the test device 110 and the device to be protected 120 may be any devices that can be connected with the network 150. The test device 110 and the device to be protected 120 may be, for example, servers, PCs, game devices, TVs, home appliances, navigation systems, tablet terminals, or cellular phones, but they are not limited to these.

<Example of Functional Configuration of Vulnerability Detection Unit 130>

Next, an example of a functional configuration of the vulnerability detection unit 130 will be described. In the example illustrated in FIG. 1, the vulnerability detection unit 130 includes a pattern generation unit (generation unit) 131, a transmission unit 132, an anomaly detection unit 133, a pattern identification unit (identification unit) 134, and a pattern aggregation unit (aggregation unit) 135.

The pattern generation unit 131 generates data of one or more test patterns to detect vulnerability by using the test device 110. Also, the pattern generation unit 131 may generate a test pattern by a packet if data is transmitted to the test device 110 in the form of a packet. Also, the pattern generation unit 131 may generate data having a predetermined process applied, for example, data having been compressed.

Also, the pattern generation unit 131 may generate data of, for example, a single test pattern, transmit it to the test device 110 via the transmission unit 132, wait for a result of anomaly detection from the test device 110, and then, generate a next test pattern.

The transmission unit 132 transmits data of test patterns generated by the pattern generation unit 131 to the test device 110. Note that the transmission unit 132 may preferably transmit test patterns to the test device 110 one by one, but it is not limited to do so in that way.

The anomaly detection unit 133 monitors predetermined behavior of the test device 110. Behavior monitoring may be executed, for example, every time data of a pattern is transmitted to the test device 110. The anomaly detection unit 133 monitors the behavior, for example, by confirming whether the test device 110 operates normally or terminates with an abnormal end in response to input of a predetermined test pattern.

Also, behavior monitoring may be implemented, for example, by monitoring string information that is output from a console port of the test device 110. For example, if the test device 110 is a server, the server may include a console port. Therefore, the console port of the test device 110 may be connected with the anomaly detection unit 133 via a transmission line. By analyzing the output from the console port of the test device 110, the anomaly detection unit 133 may be able to determine whether an anomaly occurs on the test device 110. This is because the output from the console port of a server usually includes various information items that may indicate an anomaly on the server.

Also, the anomaly detection unit 133 may detect an anomaly, by transmitting, for example, a packet for alive-dead confirmation (for example, a ping packet) from the anomaly detection unit 133 to the test device 110, and checking whether a reply has come back after a certain amount of time has passed. If the reply is not confirmed, it can be considered that the likelihood is very high for the test device 110 to have been in a state of a system-down or a hang-up. Therefore, the anomaly detection unit 133 can confirm an occurrence of an anomaly on the test device 110, by receiving no reply to the ping because the test device 110 may not be able to reply to the ping if it is in a state of an abnormal end or a hang-up.

Also, the anomaly detection unit 133 may detect whether there is an anomaly, by transmitting a command for state confirmation to the test device 110, and confirming various states obtained from the test device 110.

Also, in the embodiment, for example, to monitor behavior of the software on the test device 110, the test device may be configured, for example, on a virtual machine. Then, the software to be monitored may be run on the test device 110, the firmware or the like of the virtual machine may monitor the behavior of the test device 110, and the monitored result may be transmitted to the anomaly detection unit 133.

The pattern identification unit 134 identifies data (pattern) that causes an anomaly. If an anomaly is detected by the anomaly detection unit 133, the pattern identification unit 134 receives information about the anomaly, and stores data as prevention target data that has been transmitted just before. Note that the prevention target data is stored in a prevention target list that is provided, for example, for each pattern, but it is not limited to that.

Note that if the pattern identification unit 134 attempts to store all sets of fault-causing test data (for example, requests) in the prevention target lists, the storage area becomes tight because the number of sets of test data to be stored is too many. Also, since the data quantity is large, filtering of input data by the filtering unit 140 using the stored data takes a long time. Thereupon, the pattern aggregation unit 135 aggregates data that has caused anomalies in the prevention target lists obtained by the pattern identification unit 134.

For example, the pattern aggregation unit 135 identifies information that is common among multiple sets of test data used for testing, aggregates test results, and by using the information, reduces the amount of storage for the prevention target lists. Also, since the aggregated lists have a lesser data quantity, time required for filtering can be shortened. Note that if there are multiple prevention target lists that correspond to multiple testing methods (test types) set in advance, the pattern aggregation unit 135 may generate a list by integrating those lists.

The pattern aggregation unit 135 outputs the aggregated prevention target lists to the pattern storage unit 141 of the filtering unit 140. Also, instead of data of patterns, the pattern aggregation unit 135 may output data aggregated by, for example, lengths (bit lengths), numerical values, or specific characters of the patterns, as patterns to the pattern storage unit.

Also, the pattern aggregation unit 135 may associate a used port number or information that identifies a target application or software, with the pattern described above, to provide it to the pattern storage unit 141.

Note that in the embodiment, the process of the pattern aggregation unit 135 is executed in the vulnerability detection unit 130, but is not limited to that, and may be executed, for example, in the filtering unit 140.

<Specific Example of Filtering Unit 140>

Next, an example of a functional configuration of the filtering unit 140 will be described. In the example illustrated in FIG. 1, the filtering unit 140 includes a pattern storage unit 141 as an example of a storage unit, a comparison unit 142, and a cut-off unit 143.

The pattern storage unit 141 stores the aggregated prevention target lists and the like that are obtained from the pattern aggregation unit 135 as described above. The pattern storage unit 141 may store bit sequences of predetermined information, but it is not limited to that, and for example, may store a pattern having a range of values set, other than patterns of simple data sequences. For example, the length of a bit sequence of parameter values, or a range of parameter values may be stored as a pattern in the pattern storage unit 141. Also, a pattern may include a port number to the device to be protected 120, information about an application or software of the device to be protected 120 by which data is used.

Also, if the process of the pattern aggregation unit 135 is not executed in the vulnerability detection unit 130, the pattern storage unit 141 may apply the process of the pattern aggregation unit 135 to the stored prevention target list, to aggregate the data.

The comparison unit 142 compares each set of input data transmitted from an external device connected via the network 150, with data of one or more distinctive patterns included in the prevention target list stored in the pattern storage unit 141. Note that the unit of comparison is, for example, a packet, but it is not limited to that. The format of data flowing on the transmission line from the network 150 to the filtering unit 140 may have any format other than a packet. Also, the comparison unit 142 may compare a part of data flowing on the transmission line with a pattern stored in the pattern storage unit 141.

Also, if data flowing on the transmission line is converted by compression or the like, the comparison unit 142 may apply reverse conversion to the data for comparison. Comparison by the comparison unit 142 may not be, for example, a complete matching comparison.

For example, the comparison unit 142 may execute a comparison by determining whether input data (for example, a packet) is included in a predetermined data pattern, and based on the comparison result, to determine a positive result or a negative result. Here, a predetermined data pattern is one or more thresholds with which it is possible to determine, for example, whether data is included within a certain numerical range, or whether the number of bits of the data is within a predetermined range. By allowing ranges (thresholds) of comparison as described above other than complete matching, the comparison unit 142 can obtain a comparison result that takes analogous ranges into account.

The comparison unit 142 outputs a positive result or a negative result determined from a comparison result to the cut-off unit 143. Here, the positive result means that input data is included in a predetermined data pattern, and the data should be cut off by the cut-off unit 143. Also, the negative result means the reverse, namely, the data should pass through the cut-off unit 143.

The cut-off unit 143 filters data that is input into the device to be protected 120 from the network 150. Note that as for data that is output from the device to be protected 120 to the network 150, the cut-off unit 143 may permit the data to pass without filtering.

For example, the cut-off unit 143 inputs data from the network 150 via the transmission line, has predetermined data cut off based on a determination result obtained by the comparison unit 142, and outputs the rest of the data to the device to be protected 120.

Also, the cut-off unit 143 may obtain, for example, control information or the like from the comparison unit 142. For example, if transmitted data is separated into packets, the cut-off unit 143 may buffer the received packets. Then, when a control signal comes from the comparison unit 142 via the transmission line, the cut-off unit 143 may determine to cut off or pass the buffered packets.

The cut-off unit 143 discards the cut-off packets, but it is not limited to that. In the embodiment, the filtering unit 140 and the vulnerability detection unit 130 can operate while having the processes coordinated with each other as described above.

In this way, a new vulnerability that may be latent in the device to be protected 120 can be uncovered efficiently. In addition, transmission of data from the network 150 targeting the vulnerability can be cut off effectively. Thus, the device to be protected 120 can be protected promptly.

Note that the vulnerability detection unit 130 and the filtering unit 140 may be, for example, physically separated and/or may be installed in any places. Note that, in the filtering system 10 illustrated in FIG. 1, functions of the filtering device 100 may be included in the test device 110, or may be included in the device to be protected 120.

<Example of Hardware Configuration>

Figure 2:
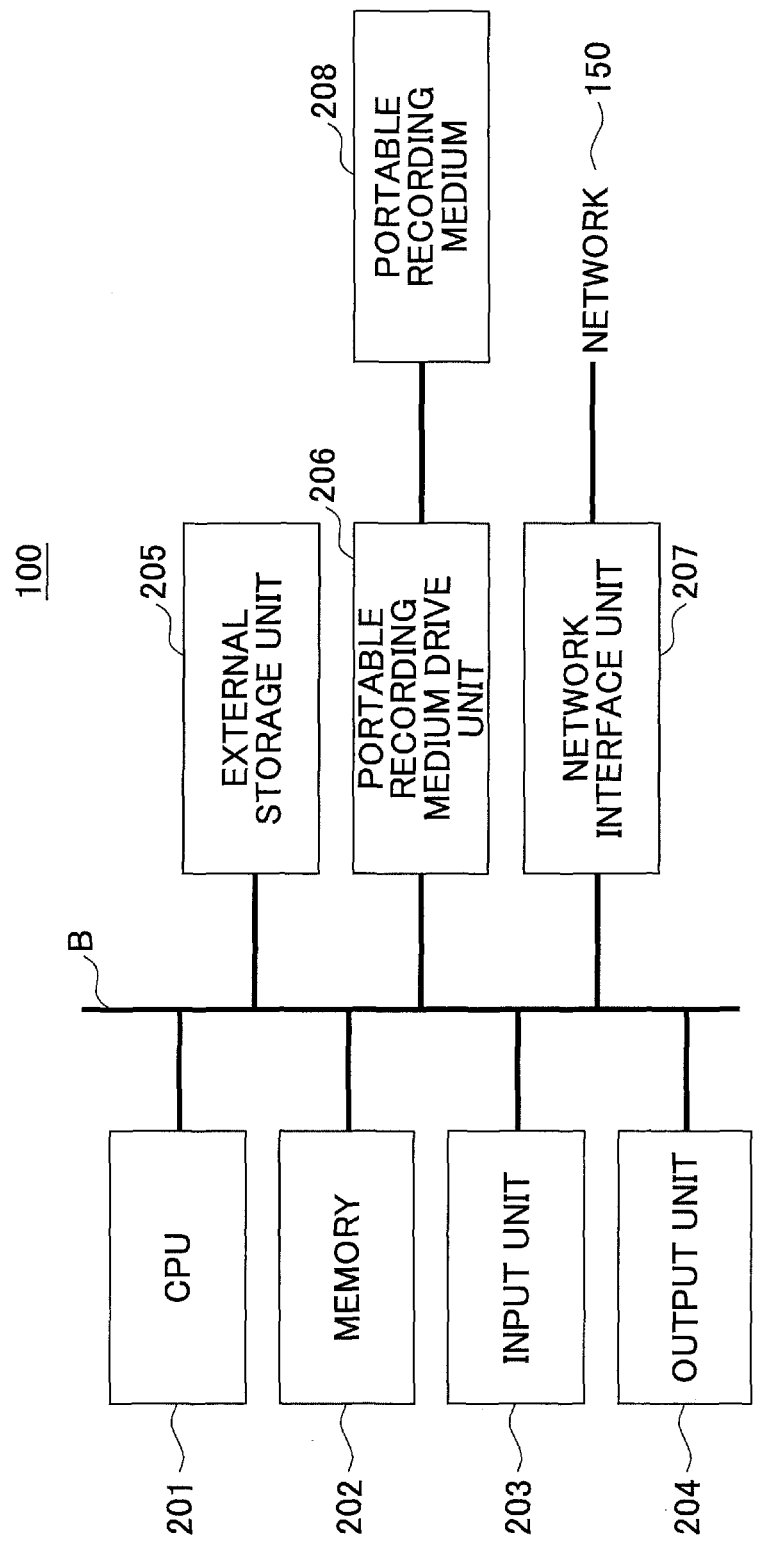
FIG. 2 is a diagram that illustrates an example of a hardware configuration of a filtering device.

FIG. 2 is a diagram that illustrates an example of a hardware configuration of the filtering device 100. The filtering device 100 in the example in FIG. 2 includes a central processing unit (CPU) 201, a memory 202, an input unit 203, an output unit 204, an external storage unit 205, a portable recording medium drive unit 206, and a network interface unit 207. These units are connected with each other via a system bus B. Note that all of or a part of the embodiment may be implemented by a program.

The CPU 201 controls the filtering device 100 as a whole based on a control program such as an operating system or the like and an execution program stored in the memory 202, to execute various calculations, and to input and output data to/from the hardware units. Note that various information items or the like required for execution of a program may be obtained from the external storage unit 205, and an execution result and the like may be stored.

For example, based on an execution command or the like of a program obtained from the input unit 203, the CPU 201 runs the program installed in the external storage unit 205 by loading the program into the memory 202. By executing, for example, a filtering program in the embodiment, the CPU 201 may execute vulnerability detection by the vulnerability detection unit 130, generation of the prevention target lists, and filtering using the prevention target lists and the like by the filtering unit 140. Note that contents of processing by the CPU 201 are not limited to these. Contents executed by the CPU 201 may be stored in the external storage unit 205 if necessary.

The memory 202 stores the execution program and the like read from the external storage unit 205 by the CPU 201. The memory 202 is a read-only memory (ROM), a random access memory (RAM), and the like.

The input unit 203 includes a keyboard, a pointing device such as a mouse, and a voice input device such as a microphone operated by a user or like. The input unit 203 receives as input an execution command of a program from the user or like, various operation information items, information for activating software or the like, and the like.

The output unit 204 includes a display for displaying various windows, data and the like to operate the filtering device 100 to execute processing according to the embodiment, and displays execution reports, results and the like of a program by the control program executed by the CPU 201. Note that in the embodiment, an execution program installed on a computer as the filtering device 100 is provided by a portable recording medium 208 or the like.

The external storage unit 205 is, for example, a storage unit such as a hard disk drive, and a solid state drive (SSD). Based on a control signal from the CPU 201, the external storage unit 205 stores the execution program in the embodiment, the control program held in the computer, and the like, and executes inputting or outputting when necessary. The external storage unit 205 reads or writes required information from or to the stored information, based on a control signal from the CPU 201.

The portable recording medium drive unit 206 can be set with a portable recording medium 208 that records the program, and can read the execution program included in the portable recording medium 208, to install it into the external storage unit 205, based on a control signal from the CPU 201. Also, the portable recording medium drive unit 206 can write various sets of data such as execution results and setting information into the portable recording medium 208, based on a control signal from the CPU 201.

The network interface unit 207, based on a control signal from the CPU 201, establishes a connection with the network 150 or the like to obtain the execution program, software, setting information, and the like from an external device or the like connected with the network 150. Also, the network interface unit 207 can provide an execution result obtained by executing a program or the execution program itself in the embodiment to an external device or the like.

The portable recording medium 208 is one or more non-transitory recording media having a structure. All of or a part of the embodiment may be implemented by a program. This program can be stored in the portable recording medium 208.

The portable recording medium 208 is, for example, a magnetic storage medium, an optical disk, an optical-magnetic storage medium, a non-volatile memory, or the like, but it is not limited to these. A magnetic storage medium is, for example, a hard disk drive (HDD), a flexible disk (FD), magnetic tape (MT), or the like. An optical disk is, for example, a digital versatile disc (DVD), a DVD-RAM, a compact disc-read only memory (CD-ROM), a CD-R (Recordable)/RW (ReWritable), or the like. Also, an optical-magnetic storage medium is, for example, a magneto-optical disk (MO), or the like. All of or a part of the embodiment may be executed by reading a program stored in the portable recording medium 208 and executing the program by the CPU 201.

In the embodiment, by installing an execution program (for example, a filtering program) on the main body of the computer having the hardware configuration described above, a display process and the like can be implemented by cooperation of the hardware resources and the software according to the embodiment. Also, the filtering program may be, for example, resident on the device, or may be activated by an activation command.

<Processing Example of Filtering Device 100>

Next, an example of a process of the filtering device 100 will be described using a flowchart according to the embodiment. In the following description, a vulnerability detection process (fuzzing test) to detect patterns of prevention target data, and a filtering process using data patterns detected by the vulnerability detection process, will be described separately.

<Example of Process of Vulnerability Detection Unit 130>

Figure 3:
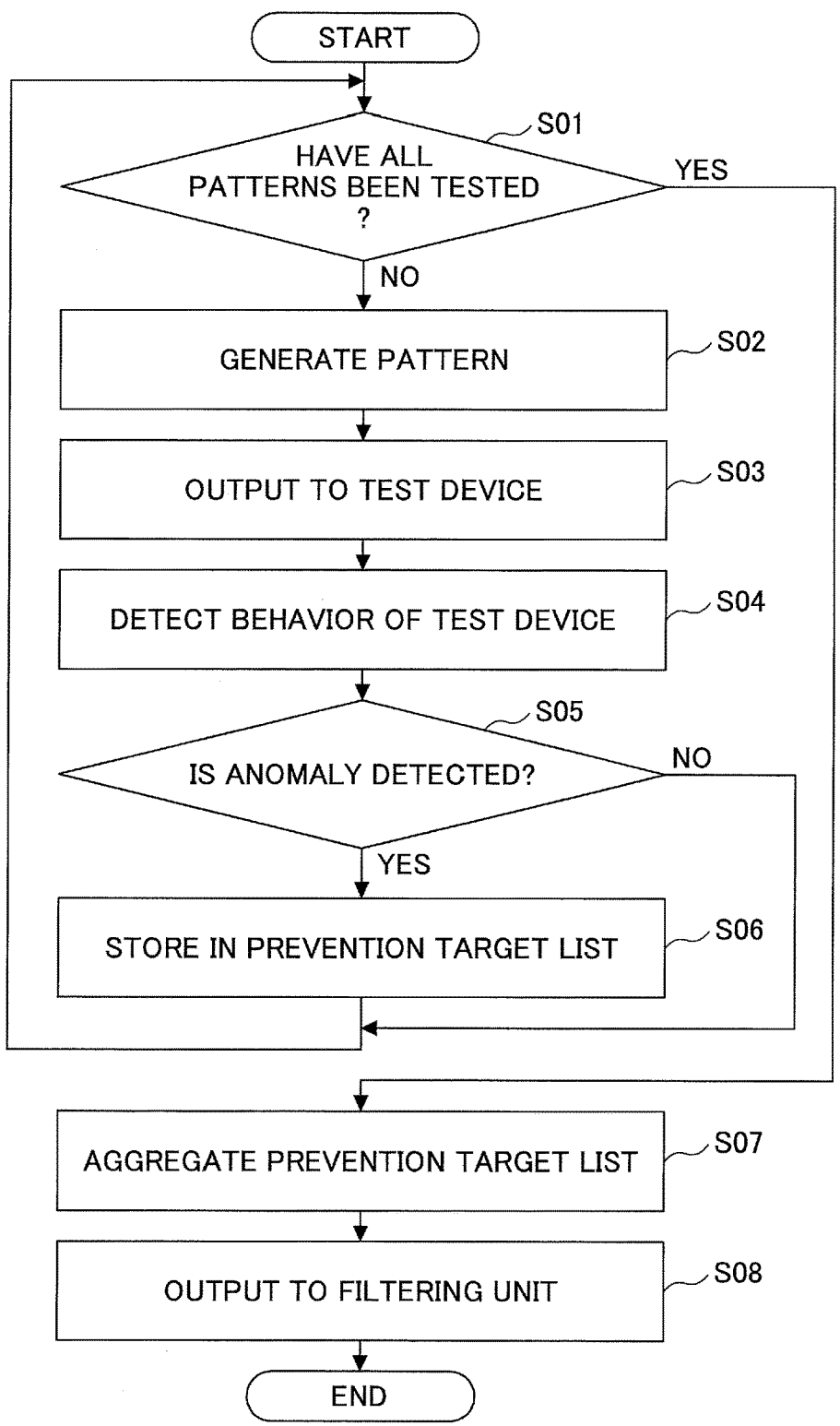
FIG. 3 is a flowchart that illustrates an example of a process of a vulnerability detection unit.

FIG. 3 is a flowchart that illustrates an example of a process of the vulnerability detection unit 130. In the example illustrated in FIG. 3, the vulnerability detection unit 130 determines whether all patterns set in advance have been tested (Step S01). In the embodiment, one or more types of test patterns exist for detecting vulnerability. Therefore, the vulnerability detection unit 130 determines whether these various patterns have been tested.

If any of the patterns has not been tested (NO at Step S01), the vulnerability detection unit 130 has the pattern generation unit 131 generate one of the patterns among the patterns set in advance that has not been tested (Step S02). Note that a pattern is, for example, a pattern of units of packets, but it is not limited to that. Also, an example of a test pattern includes data having a distinctive data length, data having a distinctive numerical value, and data having a specific character inserted or replaced, but it is not limited to these types.

The vulnerability detection unit 130 outputs the pattern generated at Step S02 from the transmission unit 132 to the test device 110 (Step S03). Note that if the test device 110 is the same device as the device to be protected 120, the vulnerability detection unit 130 may transmit the generated pattern to the device to be protected 120. In the following description, an example of outputting to the test device 110 will be described.

The vulnerability detection unit 130 detects behavior of the test device 110 by the anomaly detection unit 133 (Step S04). Detection methods of the behavior include, for example, determining whether an anomaly is output and displayed on a console of the test device 110, and checking whether a reply is received for a ping, but are not limited to these.

Next, the vulnerability detection unit 130 determines whether an anomaly has been detected on the test device 110 at Step S04 (Step S05), and if an anomaly has been detected (YES at Step S05), stores data of the anomaly-causing test pattern in the prevention target list (Step S06). If an anomaly has not been detected (NO at Step S05), or having Step S06 done, the vulnerability detection unit 130 goes back to Step S01.

If all the patterns have been tested (YES at Step S01), the vulnerability detection unit 130 has the pattern aggregation unit 135 aggregate the prevention target lists (Step S07), and output the aggregated prevention target lists to the filtering unit 140 (Step S08). Since the aggregated prevention target lists have a reduced data quantity, and data to be compared with input data has also been reduced, the filtering unit 140 can shorten time required for the filtering process.

Note that at Step S06, data of test patterns with which anomalies are detected is stored in the prevention target lists as fault-causing data patterns, but it is not limited to that. For example, the anomaly detection unit 133 may store the check result of anomaly detection. By using this stored data, the vulnerability detection unit 130 may execute progress management of testing the test device 110.

Also, by using this stored data, the vulnerability detection unit 130 may manage, for example, the vulnerability of the device to be protected 120, or may upgrade the version of an application program installed on the device to be protected 120. Having upgraded the version of the application program installed on the device to be protected 120 to reduce the vulnerability of the device to be protected 120, based on the information, the vulnerability detection unit 130 may delete patterns relevant to the vulnerability among the patterns stored in the pattern storage unit 141.

Note that the process of the vulnerability detection unit 130 described above just needs to be done before the process of the filtering unit 140 described below, but they may not need to be executed consecutively.

<Example of Process of Filtering Unit 140>

Figure 4:
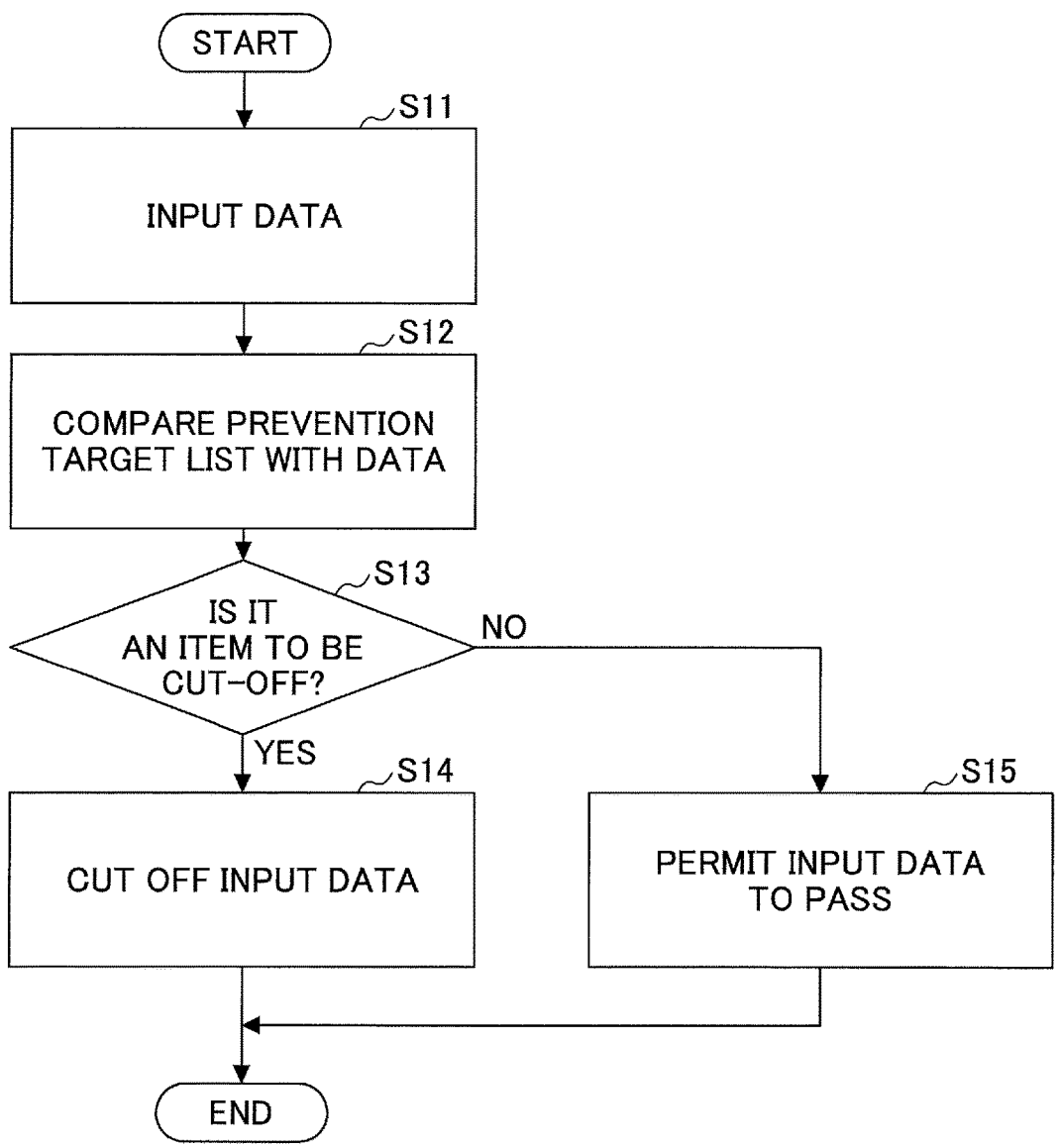
FIG. 4 is a flowchart that illustrates an example of a process of a filtering unit.

FIG. 4 is a flowchart that illustrates an example of a process of the filtering unit 140. In the example illustrated in FIG. 4, the filtering unit 140 takes input data (for example, a HyperText Transfer Protocol (HTTP) request) via the network 150 (Step S11). This data may be packet data or data in another format.

The filtering unit 140 compares the input data with the prevention target lists obtained by the vulnerability detection unit 130 (Step S12), to determine whether the input data is to be cut off (Step S13). Note that at Step S12, the filtering unit 140 refers to, for example, data of all patterns included in an aggregated prevention target list, which may include one or more different patterns, starting from the uppermost item in the list. If the input data matches with at least one set of data (or is included in a data pattern), the filtering unit 140 determines that the input data is data to be cut off, but it is not limited to that.

If determining that the input data is data to be cut off (YES at Step S13), the filtering unit 140 cuts off the input data (Step S14). The cut-off input data is discarded, but it is not limited to that. If determining that the input data is not data to be cut off (NO at Step S13), the filtering unit 140 permits the input data to pass, and outputs it to the device to be protected 120 (Step S15). Thus, the filtering unit 140 can shorten the time required for the filtering because determination whether to cut off the input data can be done with the aggregated prevention target list having a reduced data quantity.

<Example of Test Pattern Generation>

Next, an example of test pattern generation in the embodiment will be described. In general, the device to be protected 120 has different types of vulnerability depending on port numbers and applications to be run. Therefore, the pattern generation unit 131 generates test patterns for, for example, IP addresses (for example, 192.168.1.10) and port numbers (for example, 80) of the test device 110 and the device to be protected 120 that have been set in advance, and an application to be run and tested on the device to be protected 120 (for example, a business program A). Note that these test patterns are generated based on data with which the test device 110 set in advance operates normally (normal data).

Types of test patterns generated by the pattern generation unit 131 relate to, for example, information about the following testing methods (test A to C), but types of testing methods and data contents are not limited to these. For example, based on the information about the following testing methods, multiple test patterns may be combined.

<Test a (Value Length)>
Test type: test A
Normal data to be used: request A
Contents of test: consecutive x (representing a bit of 0 or 1) (buffer overflow)
Length (byte length): 1, 128, 256, 32768, or 65536

<Test B (Size of Numerical Value)>
Test type: test B
Normal data to be used: request A
Contents of test: change integer-valued header values in a normal request to specific numerical values
Numerical value: 1, 128, 256, 32768, or 65536

<Test C (Specific Character)>
Test type: test C
Normal data to be used: request A
Contents of test: an arbitrary character in a header value is replaced with a specific character, or a specific character is inserted in the header value, in the normal request.
Specific character: ¥n, ¥r, ¥0, ¥t, or ¥¥
Position to be replaced or inserted: determined randomly.

Here, FIGS. 5A-SE are diagrams that illustrate examples of a normal pattern and test patterns according to the embodiment. FIG. 5A illustrates an example of normal data (a normal packet) from which test patterns are generated, FIG. 5B to FIG. 5E illustrate test patterns (test packets) 1 to 4, respectively, which are generated based on the normal data and different from each other.

Also, the examples of the patterns in FIGS. 5A-5E represent packet data (test requests) corresponding to an HTTP request input into a Web server, assuming that the device to be protected 120 is the Web server.

In FIGS. 5A-5E, the first line (GET/HTTP/1.1) represents a request line, and the second and after lines represent various headers of HTTP protocol. Note that in an actual packet, a message part follows each of the header parts illustrated in FIGS. 5A-SE, but described below are examples of test pattern generation only for the header parts, although it is possible to generate test patterns with message parts according to the embodiment.

Contents of the header parts include, for example, a server name (Host), a data format receivable by a terminal (browser) that has transmitted a request (Accept), and a language receivable by the terminal that has transmitted a request (Accept-Language). Contents of the header parts also include, for example, the length of data in a message part represented by units of bytes (Content-Length), a maximum number of proxy servers and gateways as permissible transfer destinations (Max-Forwards). Contents of the header parts also include, for example, information about a user agent (a browser) (User-Agent), but information included in the header parts is not limited to these.

Test packets 1 to 4 illustrated in FIGS. 5B-5E are examples of test patterns generated by the pattern generation unit 131. Each of the test patterns is generated based on, for example, the normal packet in FIG. 5A, and has a part changed from the normal packet, to be used for checking contents of processing for a buffer overflow, content of processing when data including a string in a numerical-valued field is input, and the like.

For example, the example in FIG. 5B represents data (test packet 1) that has "x" 256 consecutive times in Host header. The example in FIG. 5C represents data (test packet 2) that has 256 consecutive "x" in Accept header. Such data having "x" 256 consecutive times has a parameter of the length (bit length) unlikely to be encountered normally. Note that in the example in FIGS. 5B-5C described above nulls may be used of instead of "x", and the length of the string may be longer than 256. Also, the example in FIG. 5D represents data (test packet 3) having 256 set in Content-Length header. The example in FIG. 5E represents data (test packet 4) having a specific character (for example, ¥0) inserted at a random position in the host address (Host header).

<Specific Examples of Anomaly Detection and Prevention Target List>

Next, specific examples of anomaly detection and prevention target lists will be described according to the embodiment. FIGS. 6A-10B are diagrams that illustrate first to fifth specific examples of anomaly detection and prevention target lists.

<First Specific Example>

FIGS. 6A-6C illustrate an example of test aggregation based on the test type of "test A" described above. In the example in FIG. 6A, the pattern generation unit 131 generates data that has a predetermined length (1, 128, 256, 32768, or 65536) of bit data "x" in a header (for example, Host or Accept) set in advance. The generated data is managed by a test request number. A test pattern generated by the pattern generation unit 131 is transmitted to the test device 110 by the transmission unit 132.

Assume that the anomaly detection unit 133 attempts to detect whether there is an anomaly, and detects anomalies, for example, for test request numbers enclosed in frames 300 in FIG. 6A. From the detection result by the anomaly detection unit 133, the pattern identification unit 134 stores information about test patterns with which anomalies are detected in the prevention target list as illustrated in FIG. 6B. Note that in the example in FIG. 6B, test request numbers are associated with the respective test patterns illustrated in FIG. 6A.

Next, from the test patterns in the prevention target list illustrated in FIG. 6B, the pattern aggregation unit 135 identifies information common among the test patterns, and aggregates the test patterns by using the information. For example, the pattern aggregation unit 135 identifies a regularity or a ruling property among data patterns when anomalies are detected, and aggregates information representing the test results by using the identified regularity or ruling property. In this way, the pattern aggregation unit 135 generates the aggregated prevention target list illustrated in FIG. 6C.

Fields in the prevention target list in the example in FIG. 6C are "serial number in list", "test type", "normal request", "HTTP header", and "length" as an example of aggregation information, but the fields are not limited to these. The "serial number in list" is information to identify an aggregated test pattern. The "test type" is information to identify contents of the test. The "normal request" is information to identify base request data to generate the test pattern (test request). The "HTTP header" is information to identify a name of the HTTP header having changed. The "length" is information about the aggregated test pattern.

For example, if detecting anomalies within a certain range of lengths for a header, the pattern aggregation unit 135 aggregates the prevention target list depending on the range of lengths of the target header based on information of FIGS. 6A-6B. For example, in the example in FIG. 6C, the prevention target lists (prevention target data) are aggregated for Host header with sets of data having the lengths "greater than or equal to 128", and for Accept header with sets of data having the lengths "between 128 and 256".

The filtering unit 140 stores the prevention target list described above in the pattern storage unit 141, has the comparison unit 142 compare input data with the prevention target list, and based on the comparison result, has the cut-off unit 143 apply filtering to the input data.

For example, the filtering unit 140 determines whether the length of the value of the target header is within the range covering the aggregated prevention target list, and if the condition is satisfied (included in the range), cuts off the input data (packet) being processed.

For example, if using the prevention target list in FIG. 6C described above, the filtering unit 140 cuts off the input data if the data length of Host header in the input data is greater than or equal to 128, or the data length of Accept header is between 128 and 256. For example, "test A" is a test that gradually extends the lengths of the header values. Therefore, if the test result exhibits that faults occur for the lengths greater than or equal to 128 for all header values, the list is aggregated to cut off the input data when the lengths of the headers are greater than or equal to 128.

Thus, in the embodiment, the prevention target list can be aggregated with respect to the lengths of data for HTTP headers. Therefore, the data quantity can be reduced compared to the prevention target list in FIG. 6B. Consequently, when the filtering unit 140 executes the filtering process by using the prevention target list illustrated in FIG. 6C, a lesser number of sets of data are compared, and hence, the processing time can be shortened.

<Second Specific Example>

FIGS. 7A-7B illustrate an example of test aggregation based on the test type of "test B" described above. In the example illustrated in FIGS. 7A-7B, the pattern generation unit 131 generates test patterns having distinctive predetermined sizes (1, 128, 256, 32768, and 65536) for headers (for example, Content-Length and Max-Fowards) to be set with numerical values as illustrated in FIG. 7A. Also, the pattern generation unit 131 transmits these test patterns to the test device 110 one by one to detect anomalies.

Assume that the anomaly detection unit 133 attempts to detect whether there is an anomaly, and detects anomalies, for example, for test request numbers enclosed in frames 301 in FIG. 7A. From the detection result by the anomaly detection unit 133, the pattern identification unit 134 stores information about test patterns with which anomalies are detected in the prevention target list. The pattern aggregation unit 135 identifies information common among the sets of test data in the prevention target list, and aggregates the test results by using the information to generate an aggregated prevention target list illustrated in FIG. 7B.

Thus, in the embodiment, the prevention target list can be aggregated with respect to sizes of numerical values for HTTP headers. Therefore, the data quantity can be reduced. Consequently, when the filtering unit 140 executes the filtering process by using the prevention target list illustrated in FIG. 7B, a lesser number of sets of data are compared, and hence, the processing time can be shortened. If using the prevention target list in FIG. 7B described above, the filtering unit 140 cuts off input data if the numerical value of Content-Length header in the input data is greater than or equal to 128, or the numerical value of Max-Forwards header is between 128 and 256.

<Third Specific Example>

Figures 8A, 8B:
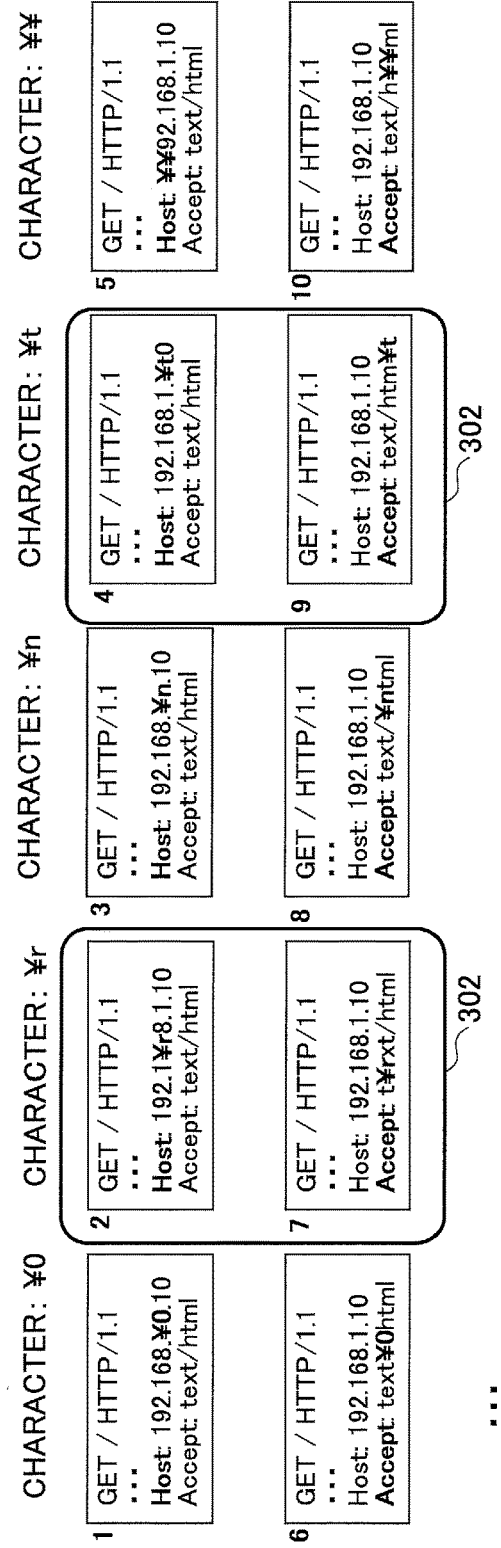
FIGS. 8A-8B are diagrams that illustrate a third specific example of anomaly detection and a prevention target list.

FIGS. 8A-8B illustrate an example of test aggregation based on the test type of "test C" described above. In the example illustrated in FIGS. 8A-8B, the pattern generation unit 131 generates test patterns for headers set in advance (for example, Host and Accept), in each of which a character is inserted or replaced with a specific character (for example, ¥n, ¥r, ¥0, ¥t, or ¥¥) in the header. Note that the specific character is at least one character and may be more, and the types are not limited to the examples described above, but can be set discretionally. Also, the specific characters preferably include one or more characters that are not usually included in the headers, but they are not limited to that.

In the embodiment, for each specific character, test patterns are generated for the respective headers, but it is not limited to that. For example, a string may be inserted or replaced with the character for specific headers set in advance.

In FIG. 8A, test requests 1 to 5 illustrate examples in which characters in Host header are replaced with specific characters ¥n, ¥r, ¥0, ¥t, and ¥¥, respectively. Also, test requests 6 to 10 illustrate examples in which characters in Accept header are replaced with specific characters ¥n, ¥r, ¥0, ¥t, and ¥¥, respectively. Note that in the examples in FIG. 8A, information of randomly set positions in the headers described above is replaced the respective characters. Also, other headers may be similarly replaced or have the characters inserted.

The pattern generation unit 131 transmits these test patterns to the test device 110 one by one to detect anomalies. Here, if anomalies are detected for test requests enclosed in frames 302 in FIG. 8A, the pattern identification unit 134 stores information about the test patterns in the prevention target list. The pattern aggregation unit 135 identifies information common among the test patterns in the prevention target list, and aggregates the test results by using the information to generate an aggregated prevention target list illustrated in FIG. 8B.

For example, if detecting an anomaly by one of the predetermined characters, the pattern aggregation unit 135 may aggregate the prevention target list depending on the character, but it is not limited to that. In the example in FIG. 8B, for a normal request of "request A" of the test type "test C", characters ¥r and ¥t are aggregated in the list. The comparison unit 142 determines whether input data includes the characters in the list as the value in the target headers, and cuts off the packet if the condition is satisfied.

<Fourth Specific Example>

Figures 9A, 9B:
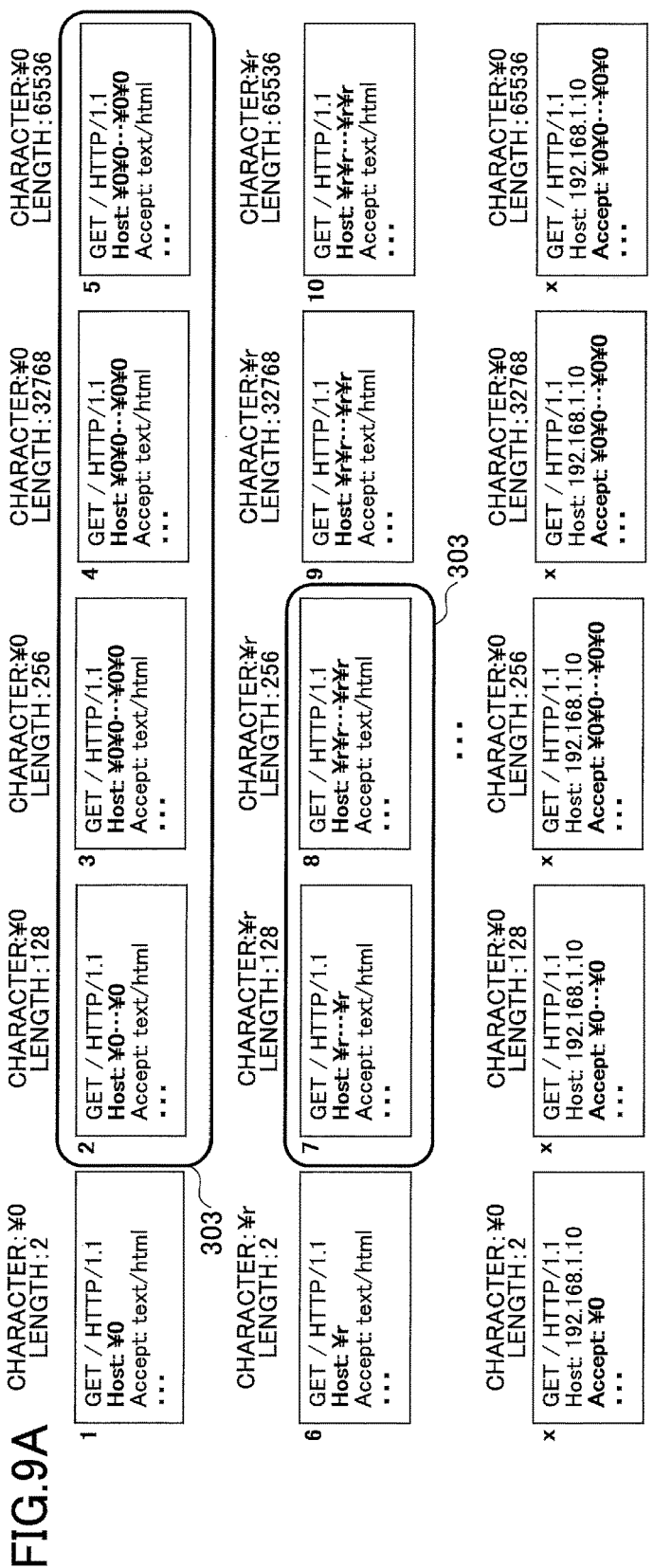
FIGS. 9A-9B are diagrams that illustrate a fourth specific example of anomaly detection and a prevention target list.

FIGS. 9A-9B are diagrams that illustrate an example that combines multiple test patterns. FIGS. 9A-9B illustrate an example that combines the test types of "test A" and "test C" described above, but it is not limited to that, and three or more test patterns may be combined.

The pattern generation unit 131 generates test patterns that have the characters and the lengths of values changed and combined as illustrated in FIG. 9A. By using these test patterns, the anomaly detection unit 133 runs a target application or the like on the test device 110 to detect anomalies as described above. Here, if anomalies are detected for test requests enclosed in frames 303 in FIG. 9A, the pattern aggregation unit 135 generates a prevention target list that aggregates the test requests by the characters and the lengths of values as illustrated in FIG. 9B.

In other words, the pattern identification unit 134 stores test requests in the prevention target list if anomalies are detected by the specific characters and with a certain range of the lengths for the respective headers. Next, the pattern aggregation unit 135 aggregates the prevention target lists obtained by the pattern identification unit 134. The comparison unit 142 compares input data with the patterns in the list based on the characters and the lengths of values included in the values of the target headers, and cuts off the packet if the condition is satisfied.

<Fifth Specific Example>

Figures 10A, 10B:
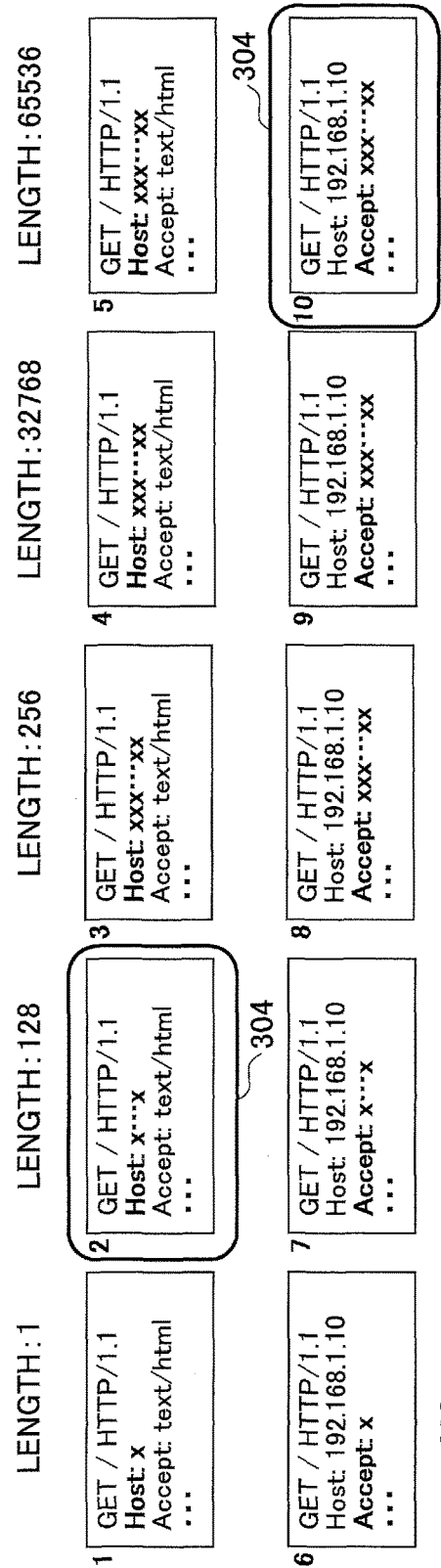
FIGS. 10A-10B are diagrams that illustrate a fifth specific example of anomaly detection and a prevention target list.

FIG. 10 illustrates an example than cannot be aggregated. Note that the example in FIG. 10 represents test results for the test A described above. Assume that testing for anomaly detection has been executed on the test device 110 by using test patterns generated by the pattern generation unit 131 as described above, and anomalies are detected for test requests enclosed in frames 304 in FIG. 10A. In this case, anomalies are detected for test requests 2 and 10. The pattern aggregation unit 135 cannot aggregate these in the list as they are, and hence, stores them with contents as illustrated in FIG. 10B.

Therefore, to make a comparison, for example, the comparison unit 142 may determine whether the length of the header corresponding to one of the test request numbers is equivalent to the length of the same header in input data. Therefore, the cut-off unit 143 can cut off the packet if the condition is satisfied.

Note that in FIG. 6A to FIG. 10B described above, the test patterns are generated by using "request A" as a normal request, but the embodiment is not limited to that. For example, test patterns may be generated by using multiple different normal requests (normal data) such as "request B" and "request C", and may be aggregated based on the test results as described above.

<Example of Aggregation Process of Test Patterns>

Figure 11:
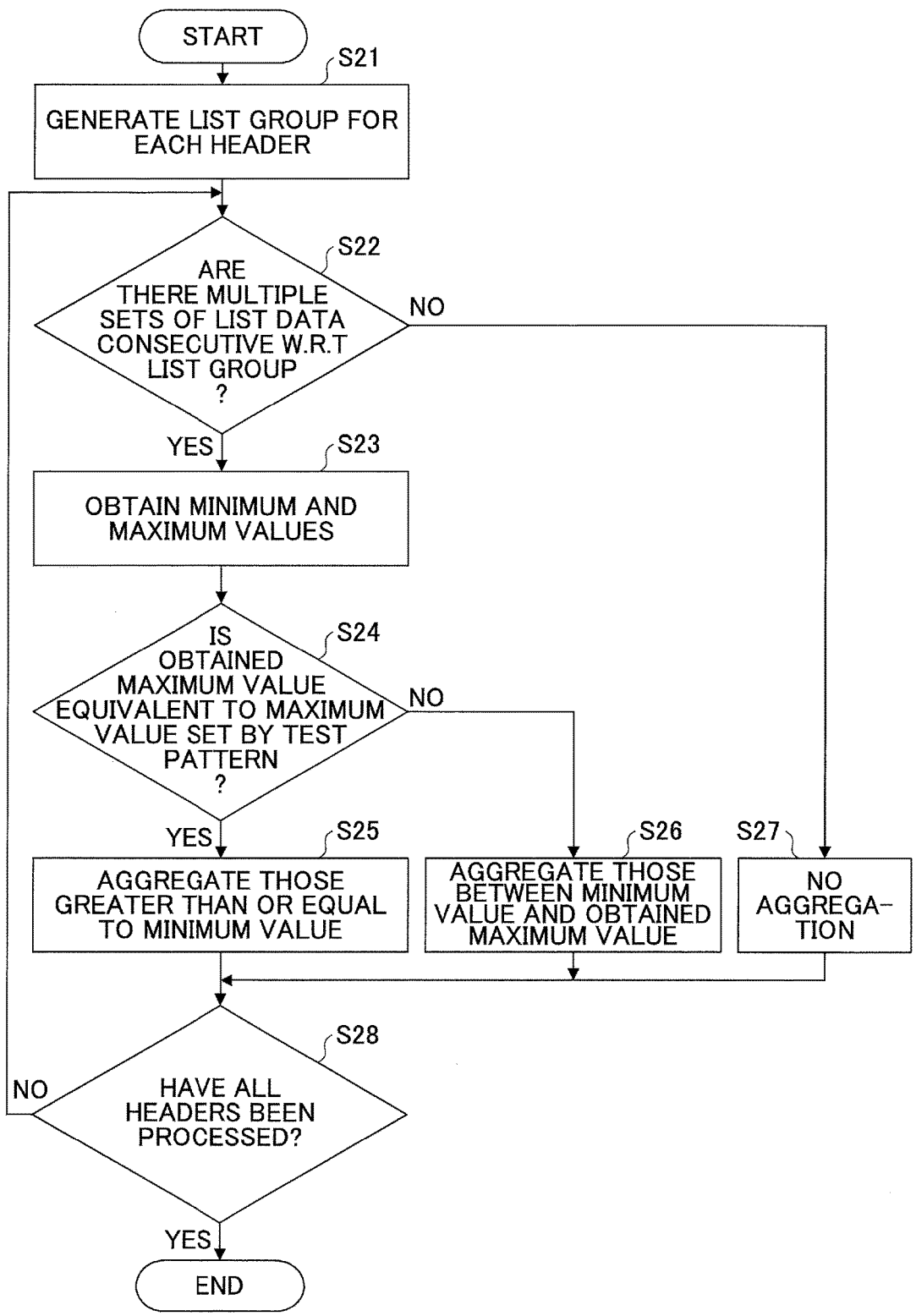
FIG. 11 is a flowchart that illustrates a first aggregation example of test patterns.

Here, an example of an aggregation process of test patterns by the pattern aggregation unit 135 described above will be described using a flowchart. FIG. 11 is a flowchart that illustrates a first aggregation example of test patterns. FIG. 11 illustrates an aggregation example for fuzzing test results by the test types of "test A" and "test B" described above.

In the example illustrated in FIG. 11, the pattern aggregation unit 135 generates a list group for headers with respect to the prevention target list stored by the pattern identification unit 134 (Step S21). For example, for FIG. 6A, four lists (128, 256, 32768, and 65536) are grouped for Host header, and two lists (128 and 256) are grouped for Accept header.

Next, the pattern aggregation unit 135 determines whether there are multiple sets of list data consecutive with respect to the list groups (Step S22). Here, "consecutive" means that, for example, setting values of patterns set in advance are consecutive. For example, "128, 256, 32768, and 5536" described above are determined to be consecutive, whereas "128 and 32768" are not.

If there are multiple sets of list data consecutive with respect to the list groups (YES at Step S22), the pattern aggregation unit 135 obtains the minimum and maximum values of those values (for the length of values in test A, or for the sizes of values in test B) (Step S23). For example, in FIG. 6A, "the minimum value is 128, and the maximum value is 65536" for Host header, and "the minimum value is 128, and the maximum value is 256" for Accept header.

Next, the pattern aggregation unit 135 determines whether the obtained maximum value is equivalent to the maximum value set by the test patterns (Step S24), and if it is the maximum value (YES at Step S24), aggregates patterns that are "greater than or equal to the minimum value" (Step S25). For example, as illustrated in FIG. 6BB, for Host header, those having the lengths greater than or equal to 128 are aggregated.

If the obtained maximum value is not equivalent to the maximum value set by the test patterns (NO at Step S24), the pattern aggregation unit 135 aggregates patterns that are between "the minimum value and the obtained maximum value" (Step S26). For example, as illustrated in FIG. 6B, for Accept header, those having the lengths between 128 and 256 are aggregated.

In the embodiment, for example, if detecting anomalies for two consecutive setting values 128 and 256, it determines that anomalies are to be detected with values between the two setting values, to cut off input data. Also, in the embodiment, if the maximum value of consecutive multiple setting values is equivalent to the maximum value set by the test patterns of consecutive multiple setting values, it aggregates, for example, patterns that are greater than or equal to the minimum value of the consecutive multiple setting values to cut off input data if the condition is satisfied.

If no consecutive multiple sets of list data are found in the list group at S22 (NO at Step 322), the pattern aggregation unit 135 executes no aggregation (Step S27).

After Step S25, S26, or S27 described above, the pattern aggregation unit 135 determines whether all headers have been processed (Step S28). If not all headers have been processed (NO at Step S28), the pattern aggregation unit 135 goes back to Step S22, and executes the process for unprocessed headers. If all headers have been processed (YES at Step S28), the pattern aggregation unit 135 terminates the process. Note that for test B, by using the similar first aggregation example, aggregation can be executed as illustrated in FIG. 7B described above.

Figure 12:
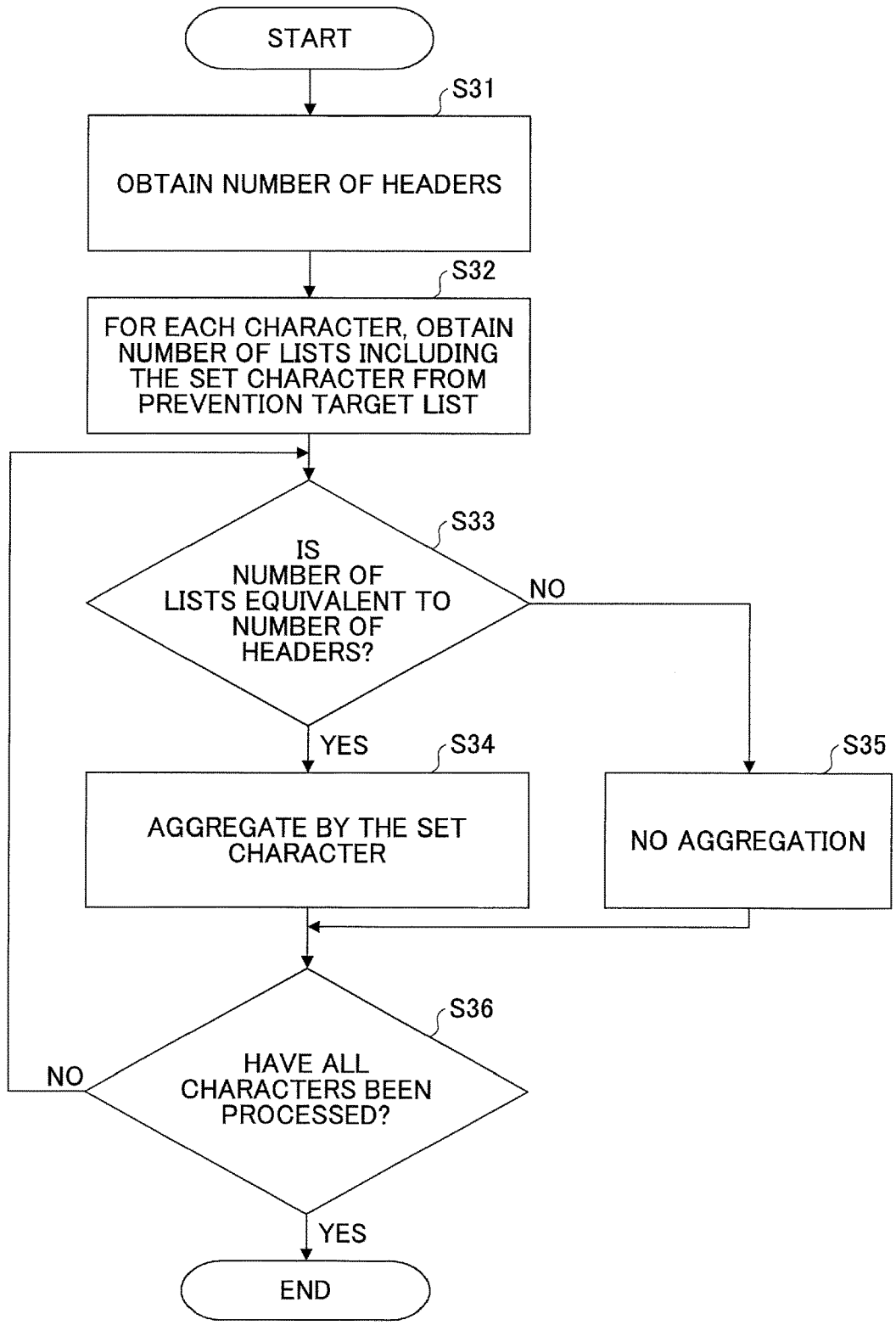
FIG. 12 is a flowchart that illustrates a second aggregation example of test patterns.

FIG. 12 is a flowchart that illustrates a second aggregation example of test patterns. FIG. 12 illustrates an aggregation example for test results by the test type of "test C" described above. In the example illustrated in FIG. 12, the pattern aggregation unit 135 obtains the number of headers included in a normal request (Step S31), and obtains the number of list items including the set characters from the prevention target list for each of the characters (Step S32). For example, in the example in FIG. 8A, the list items are counted for those including the character ¥r and the character ¥t.

Next, the pattern aggregation unit 135 determines whether the number of list items is equivalent to the number of headers for a character (Step S33), and if the number of list items is equivalent to the number of headers (YES at Step 333), aggregates patterns by the set character (Step S34). If the number of list items is not equivalent to the number of headers (NO at Step 333), the pattern aggregation unit 135 executes no aggregation (Step S35).

After Step S34 or S35 described above, the pattern aggregation unit 135 determines whether all characters have been processed (Step S36). If not all character have been processed (NO at Step S36), the pattern aggregation unit 135 goes back to Step S33 to execute the process for unprocessed characters. If all characters have been processed (YES at Step S36), the pattern aggregation unit 135 terminates the process.

Note that in the example in FIG. 12, the pattern aggregation unit 135 compares the number of list items with the number of headers, and if equivalent, aggregates patterns by the character, but it is not limited to that. The pattern aggregation unit 135 may aggregate data patterns by a specific character set in advance, based on the number of patterns having the specific character set by the pattern generation unit 131, and the number of data patterns with which anomalies are detected on the test device 110.

Aggregation examples by the pattern aggregation unit 135 are not limited to the examples illustrated in FIG. 11 and FIG. 12 described above. For example, as illustrated in FIG. 10, if combining multiple test contents, the aggregation process can be executed by combining all or a part of the processes in FIG. 11 and FIG. 12 described above.

<Comparison Example Using Prevention Target Request>

The pattern aggregation unit 135 controls filtering by determining whether to transmit a packet transmitted from the network 150 to the device to be protected 120, for example, by using prevention target requests obtained with multiple test types (test A to test C).

Figure 13:
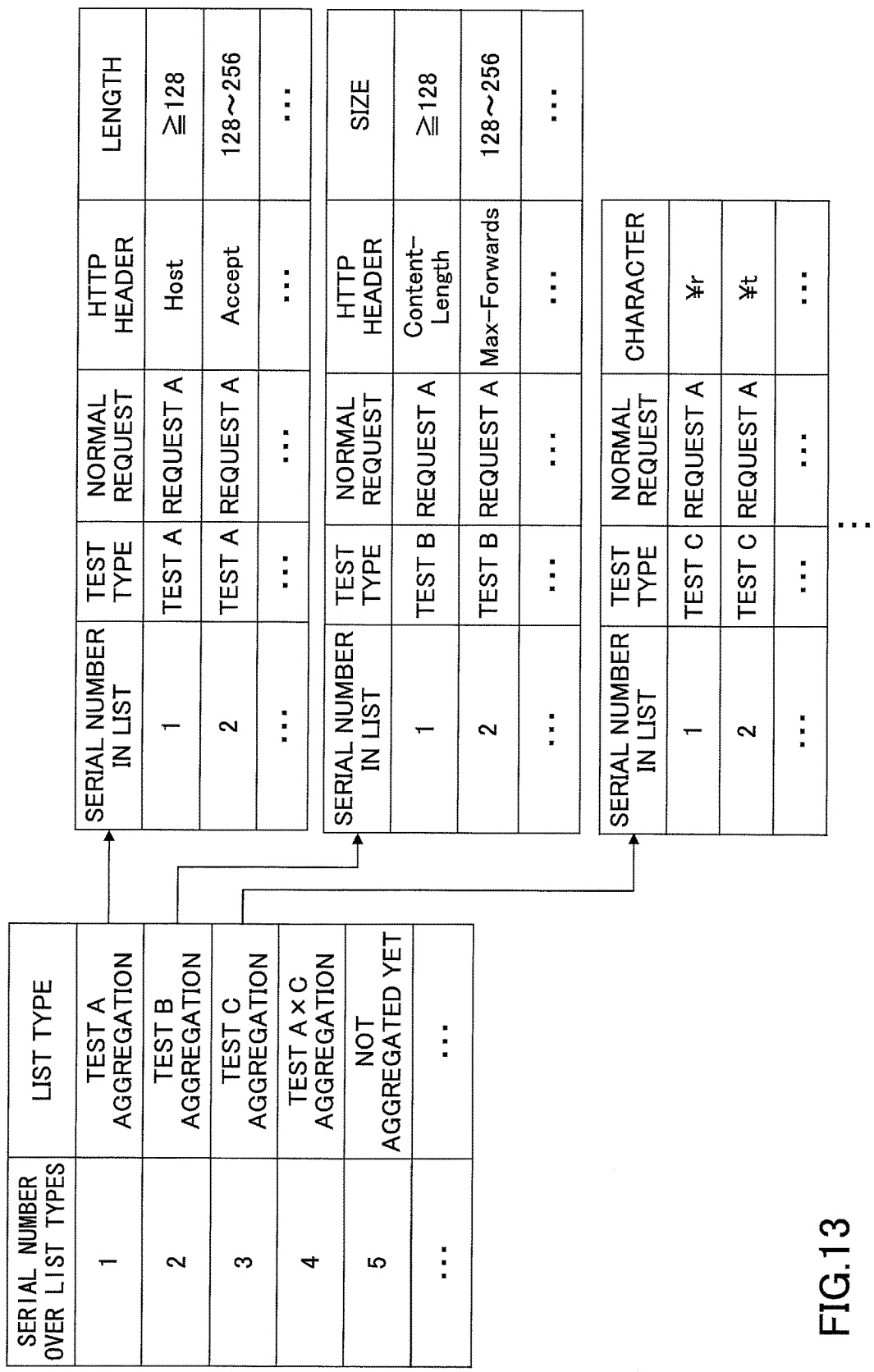
FIG. 13 is a diagram that illustrates a specific example of a prevention target list.

Here, FIG. 13 is a diagram that illustrates a specific example of a prevention target list. If there are multiple prevention target lists corresponding to respective test types as illustrated in the example in FIG. 13, the pattern aggregation unit 135 integrates the multiple lists.

In the embodiment, for example, an integrated prevention target list is generated in which "sequential numbers over list types" are associated with "list types" as illustrated in FIG. 13. Note that "test A aggregation" in the field of the list type means, for example, the prevention target list illustrated in FIG. 6C described above, and "test AxC aggregation" means, for example, the prevention target list of combined test A and test C illustrated in FIG. 9B described above. Also, "not aggregated yet" in the field of the list type means, for example, the prevention target list illustrated in FIG. 10B described above, but the order and types of the list types are not limited to these.

The comparison unit 142 refers to the sequential numbers over list types of the integrated prevention target list illustrated in FIG. 13, and compares input data (packet) with the patterns, for example, using the prevention target lists of list types selected in advance or all list types, in order of the sequential numbers over list types. Thus, the cut-off unit 143 can execute filtering appropriately. Moreover, by using the lists, the corresponding processes can be reduced.

<Other Embodiments of Filtering System>

Figure 14A:
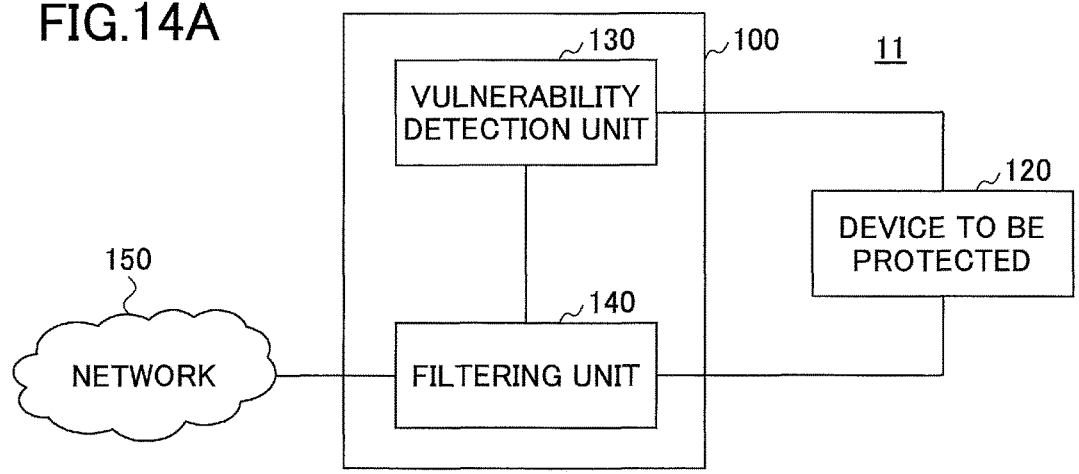
FIGS. 14A-14C are diagrams that illustrate examples of filtering systems according to other embodiments.
Figure 14B:
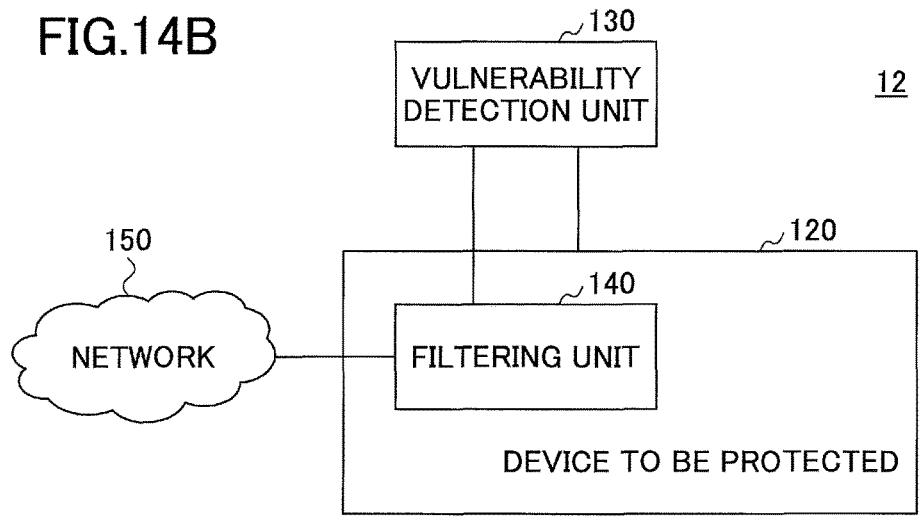
Figure 14C:
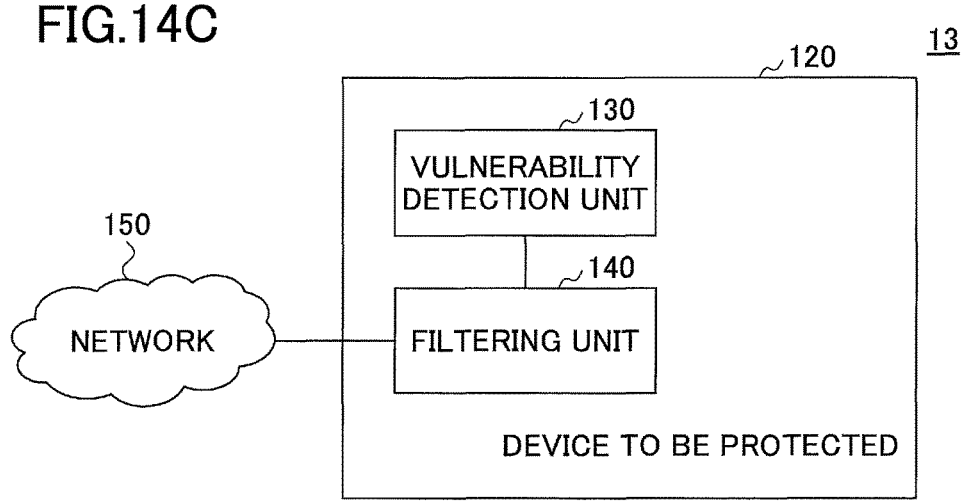

Next, embodiments other than the above filtering system 10 will be described using FIGS. 14A-14C. FIGS. 14A-14C are diagrams that illustrate examples of filtering systems according to the other embodiments. Compared with the filtering system 10 described above, a filtering system 11 illustrated in FIG. 14A does not have a test device 110, and has the vulnerability detection unit 130 of the filtering device 100 connected with the device to be protected 120.

In other words, in the embodiment illustrated in FIG. 14A, the device to be protected 120 can be checked directly, and hence, the test device 110 is not required for estimating behavior of the device to be protected 120. Also, vulnerability can be checked more correctly than by using the test device 110. Patterns to be prevented that have been identified by the vulnerability detection unit 130 are output to the filtering unit 140 via the transmission line.

Note that in the filtering system 11 illustrated in FIG. 14A, since the vulnerability detection unit 130 detects an anomaly by outputting the test patterns directly to the device to be protected 120, a system down time may occur with the device to be protected 120. Therefore, it is preferable to execute testing for vulnerability by having the vulnerability detection unit 130 operate, for example, during a system maintenance time of the device to be protected 120. Note that if the device to be protected 120 can be rebooted promptly, the vulnerability detection unit 130 may be operated during normal operation of the device to be protected 120.

In a filtering system 12 illustrated in FIG. 14B, the filtering unit 140 is installed, for example, in the device to be protected 120. For example, the filtering unit 140 may be installed in a front-end part in the device to be protected 120. Therefore, filtering operations can be customized in the filtering unit 140 for a specific device to be protected 120, which may be more suitable as measures to cope with vulnerability of the device to be protected 120.

Note that in the case of FIG. 14B, the vulnerability detection unit 130 is connected with the device to be protected 120 via the transmission line, but is not limited to that, and a test device 110 may be provided separately. Also, in the example in FIG. 14B, patterns to be prevented that have been identified by the vulnerability detection unit 130 are output directly to the filtering unit 140 via the transmission line.

A filtering system 13 illustrated in FIG. 14C has the vulnerability detection unit 130 and the filtering unit 140 provided, for example, in the device to be protected 120. Note that in the example in FIG. 14C, since the vulnerability detection unit 130 exists in the device to be protected 120, an abnormal operation of the device to be protected 120 may affect the operation of the vulnerability detection unit 130. Therefore, in the example in FIG. 14C, an abnormal operation of the device to be protected 120 may affect identification of patterns by the device to be protected 120. To cope with such a situation, it is preferable, for example, to have multiple virtual machines operate for a server or a device to be protected 120, and to have the vulnerability detection unit 130 and the device to be protected 120 run on different virtual machines. This makes it possible to greatly reduce the influence of an abnormal operation of the device to be protected 120, on identification of patterns by the device to be protected 120.

As described above, according to the embodiments, the data quantity of the prevention target list can be reduced, and the time required for filtering can be shortened. Also, a device connected with a network can be effectively protected for the vulnerability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory, the processor
generates one or more data items corresponding to information about a testing method set in advance,
inputs the generated data items to a test device,
identifies data items causing the test device to exhibit a predetermined behavior, among the generated data items, and
identifies information that is common among the identified data items, to aggregate a prevention target list with the common information,
wherein the processor generates, based on the number of data items in which a specific character set in advance is inserted and the number of data items with which an anomaly of the test device is detected, an aggregated prevention target list including the specific character, for filtering of input data being transferred to a device to be protected to discard input data items including the specific character,
the processor aggregates the generated data items by obtaining a consecutiveness of data items having detected the anomaly of the test device, or a minimum value and a maximum value among the data items having detected the anomaly, and aggregate the data items having detected the anomaly, by a range of numerical values, based on a result of comparison between the obtained maximum value and a maximum value among the generated data items, and
the test device is a same device as the device to be protected.

2. The information processing device as claimed in claim 1, wherein the processor
compares input data items received via a network with the aggregated data items, and
cuts off the input data items so as not to be output to the device to be protected, based on a result of comparing the input data items with the aggregated data items.

3. The information processing device as claimed in claim 1, wherein the processor generates the one or more data items, based on the testing method, having at least one of a data length, a data size, and an existence of the specific character, changed with respect to normal data items with which the test device operates normally.

* * * * *